UNITED STATES PATENT OFFICE.

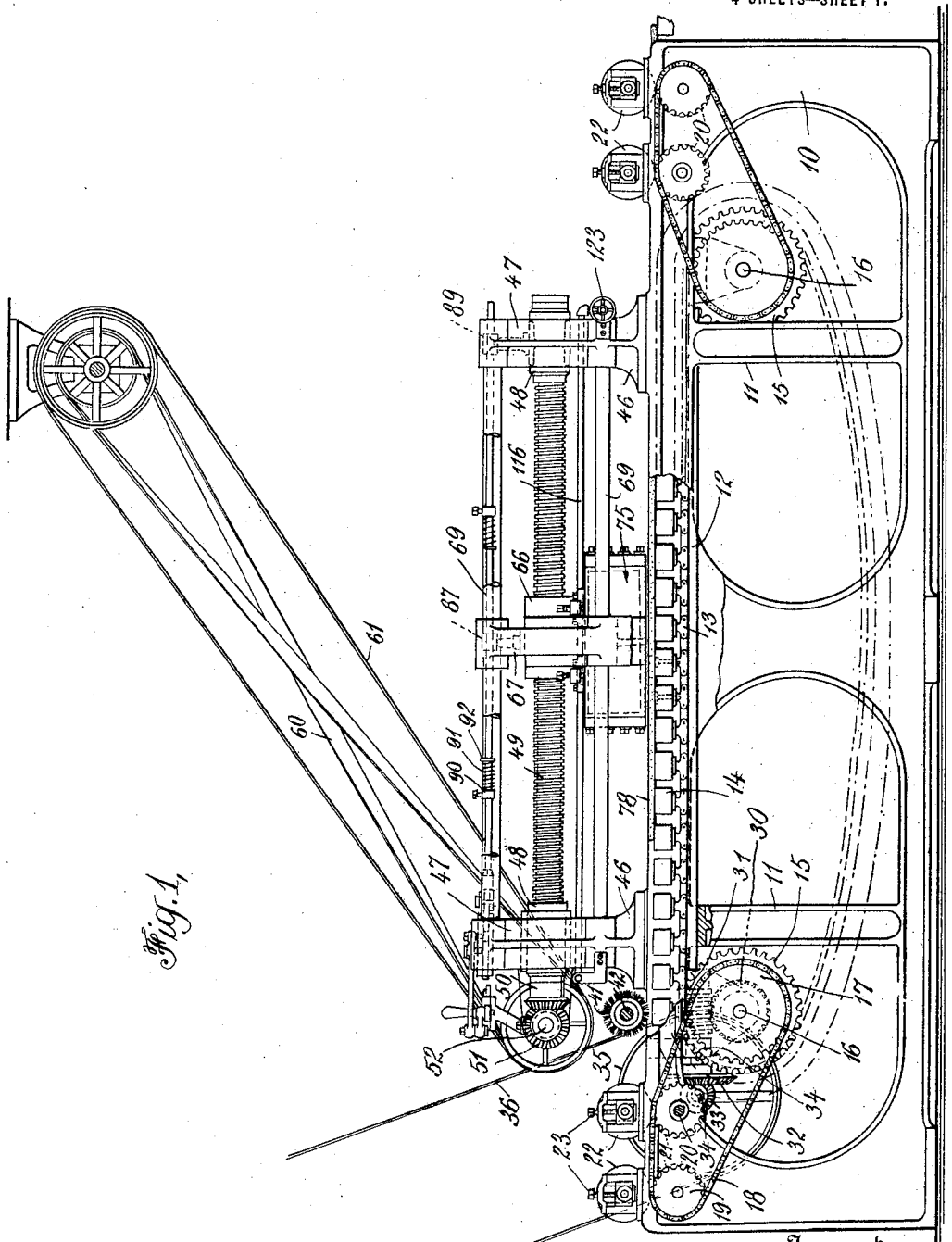

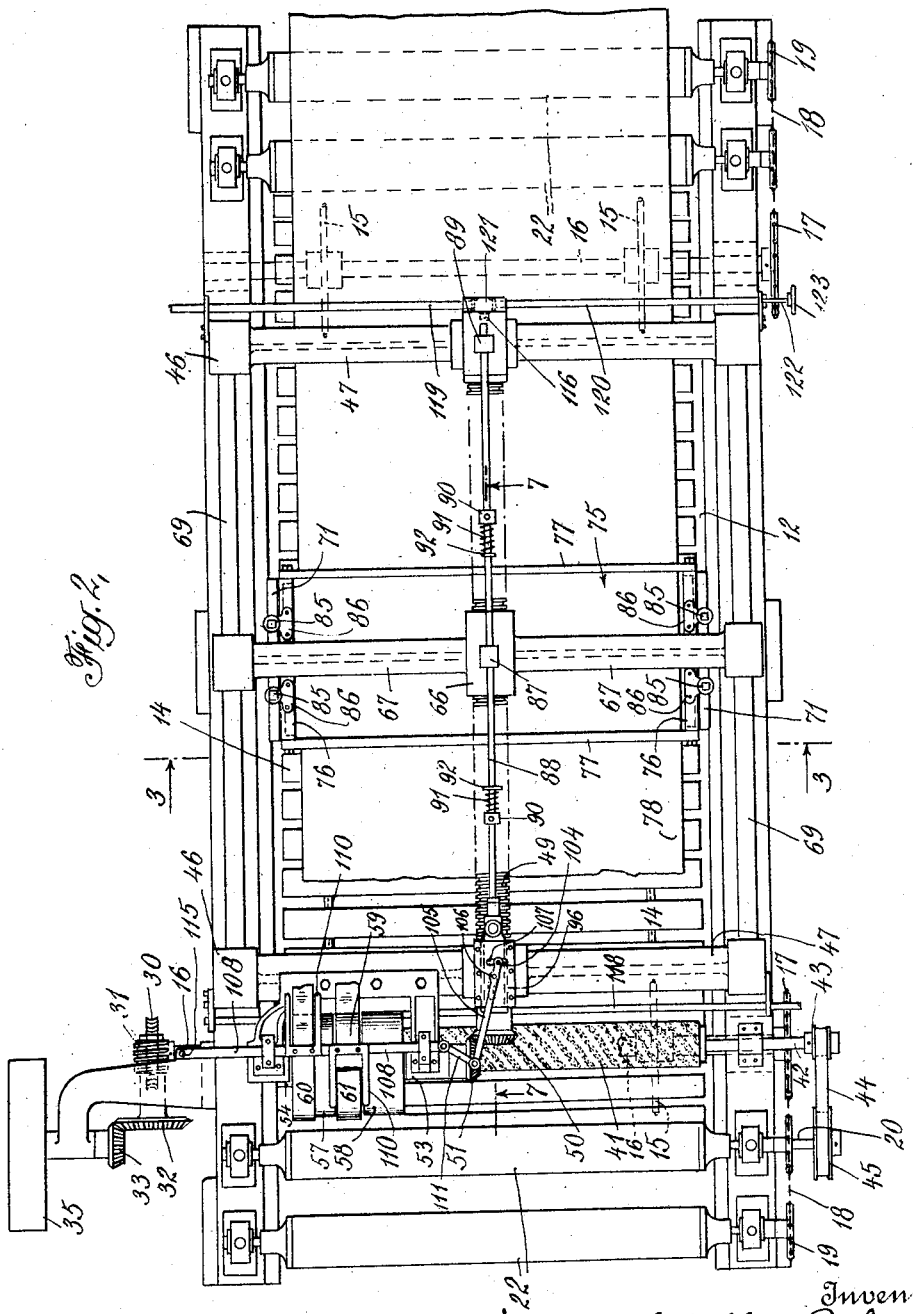

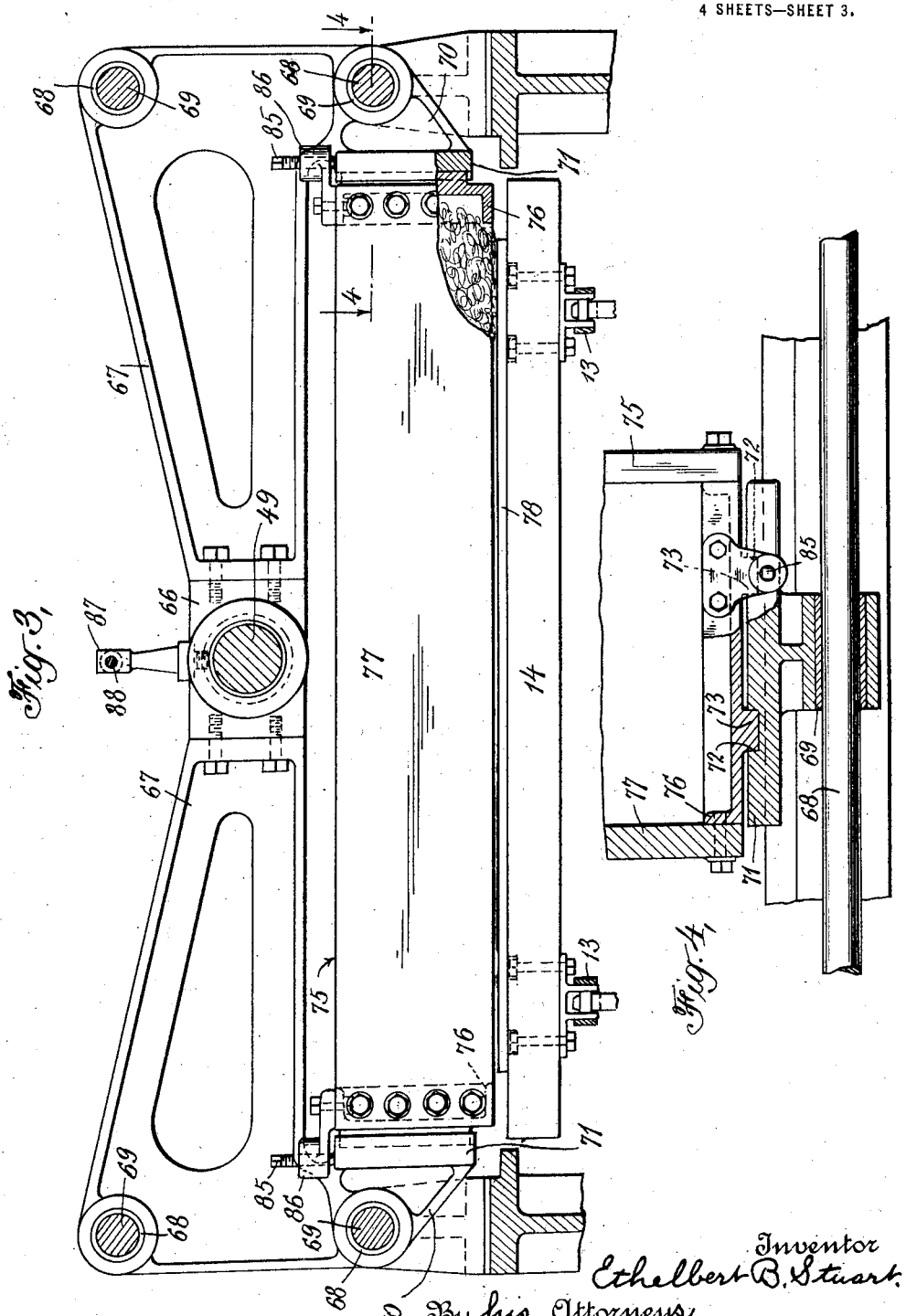

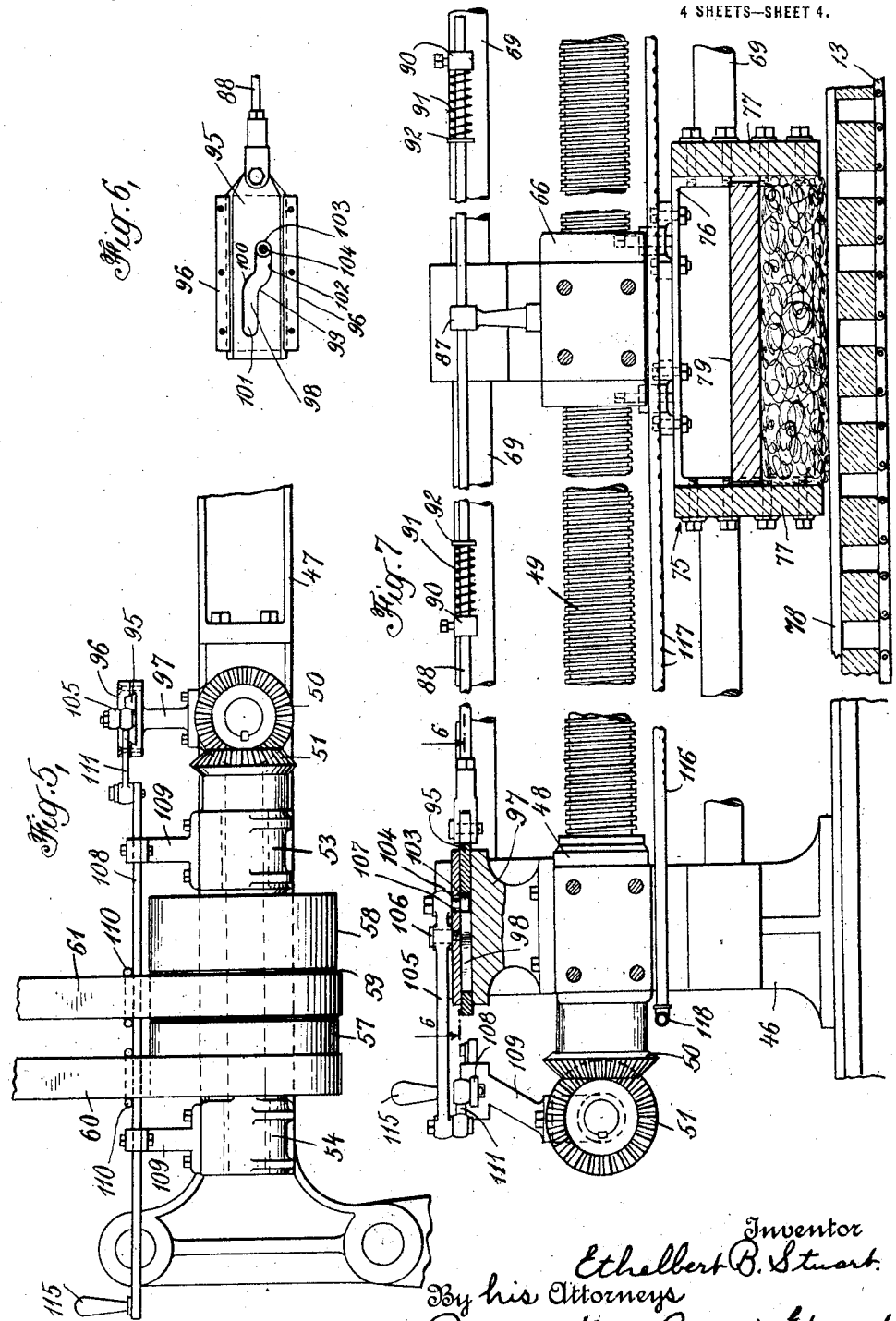

ETHELBERT B. STUART, OF BUFFALO, NEW YORK, ASSIGNOR TO THE BEAVER COMPANY, A CORPORATION OF OHIO.

RUBBING MACHINE.

1,405,639.       Specification of Letters Patent.        Patented Feb. 7, 1922.

Application filed June 2, 1920. Serial No. 386,122.

*To all whom it may concern:*

Be it known that I, ETHELBERT B. STUART, a citizen of the United States, residing at Buffalo, in the county of Erie, State of New York, have invented certain new and useful Improvements in Rubbing Machines; and I do hereby declare the following to be a full, clear, and exact description of the invention, such as will enable others skilled in the art to which it appertains to make and use the same.

My invention relates to an improved machine for rubbing blackboards of laminated structure and other similar articles either in their natural state or having a coating applied thereto, and comprises means for removing inequalities in the surface of practically any article having a continuous top surface and thereby reducing it to a smooth, regular and finished character.

The advantage of the invention is that it applies the rubbing or smoothing action to a member capable of being continuously advanced to and withdrawn from the rubbing member, and thus presents a saving in time incident to the fastening of individual pieces of articles to be smoothed, said continuous articles being cut and trimmed after this smoothing process has been accomplished. The mechanism included in my invention enables equal smoothing action to be developed on both strokes of the smoothing member, that is to say, compensation is made for the speed of the traveling article being subjected to the smoothing process which has a speed of its own, and consequently the rubber has imparted to it two speeds, the faster one being in the direction of the travel of the smoothed member. A still further advantage resides in the fact that the smoothing traveler or rubber when once applied to this work needs no further attention for a considerable length of time, as means are present for automatically presenting new surfaces of the rubbing material to that which is to be smoothed.

Other advantages will be apparent in connection with the following and in the description of the drawings forming a part of this specification; in which, Fig. 1 represents a longitudinal side elevation partly of the assembled machine, with parts broken away;

Fig. 2 represents a plan view with a few of the parts broken away;

Fig. 3 shows an end view of the rubber box, its supporting frame work and guiding and actuating mechanism, being a section on line 3—3 of Fig. 2 looking in the direction of the arrow;

Fig. 4 is a detailed view partly in cross section of the portion of the rubbing box adjacent one of the guides, and shows means for retaining it in vertical alignment and also for adjusting its vertical position, being a section taken on the line 4—4 of Fig. 3;

Fig. 5 shows an elevational end view of the belt shifting mechanism;

Fig. 6 is a detailed plan of the cam actuating the belt shifter; and

Fig. 7 is an elevational view of part of one end of the machine showing the screw actuator and the stops for the belt shifting mechanism.

The frame work supporting the mechanism to be described comprises longitudinal side frame members 10 which are rigidly joined to each other by suitably transverse frame members 11 securely bolted thereto. Between the frames 10 and carried by the transverse frame members 11 is a solid continuous table 12 across which is traveled, and by which is supported the conveyor sprocket chain 13 extending upon both sides of the machine, and having as a part thereof a plurality of slats 14 of considerable cross section so as to supply the necessary rigidity and to suitably support the blackboard or like material to be smoothed. The conveyor 13 being endless passes at each end over sprocket wheels 15 fast upon the shaft 16 which at one end of the machine has also fastened to it a sprocket wheel 17 driving a sprocket chain 18 passing around small sprocket wheels 19 which are fast on feed roller shafts 20 carrying feed rollers 21 which drive top feed roller shafts 22 supported in bearings which are adjustable in position by means of the bolts 23. The shaft 16 is driven by worm wheel 30 fast on it and contacting with and driven by the worm 31 whose shaft has at its outer end the bevel gear 32 meshing with the corresponding bevel gear 33 fast on shaft 34. Shaft 34 is actuated by a pulley 35 driven by a belt 36 from a line of shafting or suitably positioned motor. The just above described mechanism is continuously driven except when the machine proper is stopped by a suitable stopping apparatus. The sprocket wheel 15 at the right end of the machine viewed in Fig. 1 corresponding to the sprocket wheel upon the shaft 16 at the left is driven by the conveyor sprocket chain 13, and this shaft carries the sprocket wheel corresponding to sprocket wheel 17 at the other end of the machine which transmits power by sprocket chain to sprocket wheels upon a corresponding set of feed rollers 20 and 22 at the right end of the machine.

Turning to the left of the machine there is a rotary cleaning brush 41 upon its shaft 42 and reference to Fig. 2 will show that it carries at the forward end of its shaft a fast pulley 43 connected by belt 44 to pulley 45 upon one of the feed roller shafts 2—nearest thereto, so that the brush is continuously rotated during the operation of the machine. Supported upon the lower frame work already described are four standards 46 at the respective corners of a rectangle, and each pair of end standards is joined by cross frame 47 suitably bolted to the standards 46, members 46 and 47 forming the upper frame work for the mechanism. The left hand cross frame of Fig. 1 is provided with a housing to support the bearing 48 and one end of a longitudinally extending screw 49, the corresponding end of which has a similar bearing 48 in the cross frame at the other end of the machine. This screw member actuates the rubber as will be shown in detail, it being desirable to indicate at this point that the screw is rotated at two different speeds, the slow speed being utilized when the rubber is traveling against the oncoming blackboard, and the faster speed being used when the rubber is traveling with the continuously traveling blackboard in web or belt-like form. Beyond the bearing 48 at the left and exterior to the cross frame 47 a bevel gear 50 is fixedly attached to the worm shaft 49, these parts being shown more in detail in Figs. 2, 5, and 7. The corresponding bevel gear 51 fast on a short shaft 52 extends to near the rear side of the machine, being suitably provided with supporting bearings 53 and 54 at and between its ends. Interposed between the bearings 53 and 54 are two loose pulleys 57 and 58 and a pulley 59 fast upon the shaft 52 thereby driving it. Belt 60 is positioned to run upon loose pulley 57 and belt 61 upon loose pulley 58 when not in driving position on the fast pulley 59. The belt 60 should be further termed the slow belt as it drives when on the pulley 59 the worm 49 at its lower speed, while belt 61 should be termed the fast belt as it in turn drives the pulley 69 and worm 49 through the connection described at a high speed necessary when the rubber moves with the traveling blackboard web, and it is obvious that mechanism is necessary to repeatedly shift the belts 60 and 61 to and from the pulley 59 in order to drive the worm as referred to, and this mechanism shall be more fully described in connection with the travel of the worm and the rubbing box to be dealt with later.

Having stated that the worm 49 is rotated in one direction and then in another direction at an increased speed, it will be noted in Figs. 1, 2, 3, and 7 that a surrounding nut 66, shown in the drawings as a full nut, but which may be obviously split to assist in repairing operations, receives the motion of the worm shaft 49. Said nut 66 is interposed between two moving transverse frame members 67 being rigidly bolted thereto, said movable frame being provided at the four corners thereof with bearing sleeves 68 moving upon longitudinal guides 69 which extend between the two transverse frame members 47, and which are fastened at their ends therein. Adjacent the lower guides 69 on each edge of the machine, brackets 70 are formed upon the transverse members 67 and extend upon each side thereof so as to supply by means of the ledge 71 the supporting surface for the rubbing box. The ledge on each side is provided with two vertical grooves 72 into which corresponding tongues 73 on the frame work of the rubbing box extend with a neat fit so as to permit vertical adjustment of the rubbing box with regard to the ledge 71 and the transverse frame of which it is a part, but at the same time to prevent any lateral movement of the rubbing box. These tongues and grooves although not so shown may be supplied with replaceable rubbing surfaces readily adjusted so as to make up and compensate for any wear which may result. The rubbing box 75 comprises two end members 76 bolted to two transverse members 77 and thus far presenting nothing more than an open frame extending transversely of the blackboard which is to be rubbed. As the box is bottomless its contents will drop to and rest upon the continuously moving web of blackboard material 78 which thus forms a moving bottom for the rubbing box. In this box is placed a suitable quantity of moss or sea-grass or other similar material which carries upon its upper surface a plate 79 serving the purpose of a weight to press evenly the contents of the box on to the moving blackboard web. There is applied to the surface of the blackboard to be smoothed any suitable abrasive or polishing material such as powdered pumice, ground emery or carborundum. It is obvious that in a corresponding way sand paper or emery paper may be fitted in the lower portions of the box forming as in the case of the sea-moss or other contents a pad moving upon the surface of the blackboard.

Other materials, of course, may be used for the contents of the box and for the abrasive material either upon the surface of the blackboard or upon the lower surface of the contents of the box.

It is, of course, important that the lower edge of the rubbing box shall in no way touch the upper surface of the blackboard, and in fact it should be retained a short distance therefrom, one-half inch probably being sufficient, but this distance may be varied by manipulation of the adjusting screws 85 which pass through the brackets 86 at the four upper corners of the rubbing box. It is obvious that as these screws 85 rest upon the upper surface of the ledge 71 that the adjustment of the box to and from the blackboard is readily made.

In order to initiate the reversal of travel of the rubbing box a stop 87 is fastened upon the nut 66 and slides over a rod 88 which extends between and across the longitudinal path of the rubbing box and its supporting frame work being positioned at one of its ends in the bearing 89, and having formed at its other end a connection with a cam member 95 of the belt shifting mechanism. Removably pinned to this rod are two dogs 90 which are placed adjacent the end of travel of the stop member 87. On the side of the dogs 90 toward the approach of the stop 87 a spring 91 is provided to absorb the shock of contact of the stop 87, and also to impart a quick spring motion to the shifter rod 88 at the beginning of its movement. A contact washer 92 is supplied to prevent wearing of the end of the spring, and also to present a suitable surface for contact with the stop 87.

In the traveling to and fro of the rubbing box it is plain that the stop 87 will contact with and move the corresponding dogs 90 first in one direction and then in the other, causing the shifter rod 88 upon which they are temporarily fastened to impart its motion to the cam member 95 to which it is pivotally connected, Fig. 6. The cam 95 is arranged to slide between a top retaining member 96 and the upper extended portion of a bracket 97, which with the top retaining member 96 has its surface contacting with the edges of the cam bevelled to correspond with the edges of the cam. The cam slot 98 in the cam slides 95 has the cam surfaces 99 and 100 and the dwell portions 101 and 102 receiving a roller 103 carried upon a vertical pin 104 rigidly fastened on the inner end of arm 105 pivoted at 106. The pivot 106 is carried on the cam retaining member 96 and the pin 104 extends downwardly through a transverse slot 107 in the plate 96 so as to position the roller 103 in the cam slot 98, it being obvious that when the shifter rod 88 is moved so as to bring the cam surface 99 against the roller 103 that the pin 104 will be shifted sidewise with the obvious movement of the arm 105. And likewise, when the cam is moved by the shifter rod to the other extent of its movement that the cam surface 100 will contact with the roller 103 and move the pin the other way across the transverse slot 107 imparting the opposite swing to the arm 105. The outer end of the arm 105 is pivotally connected to the link 111 which at its other end is pivotally connected to the belt shifter 108 of the usual form supported in brackets 109 and provided with the usual prongs 110 for contacting with the edges of the belts. By the traveling of the shifter rod above described the belts 60 and 61 are alternately shifted on to the fast pulley 59, and it should here be noted that belt 60 as shown in Fig. 1 is a cross belt and extends from a smaller pulley than the one which drives the belt 61. Thus the speed of the belt 60 is reduced while it drives in the same direction as the belt 61. When any hand manipulation of the belts is required, use is made of handle 115 to shift the belts regardless of the position of the stop 87.

In order to supply the necessary liquid, that is water, or some similar substance, the longitudinal piping member 116 is provided having suitably spaced orifices 117 therein. At the ends of the machine transverse pipes 118 and 119 join this sprinkler pipe to a water system, while tube 120 extends from a valve 121 at one end of the sprinkler pipe to the side of the machine. Extending through tube 120 is a rod 122 carrying a hand wheel 123 by which valve 121 is turned and the flow of liquid through the piping is regulated, it, of course, being apparent that the pipe 118 at the left of the machine is utilized as a waste pipe so that a single valve 121 will control the system. Other arrangements of the piping are possible, for instance, sprinkler heads might be attached to the rubbing box 75 which would extend the sprinklers across the breadth of the blackboard rather than longitudinally thereof. The sprinkler heads one on each side of the rubbing box might be joined by rubber hose of sufficient length to permit the to and fro motion of the sprinkler heads due to the motion of the rubbing box. The rubber tubing in turn could very well be replaced by piping having a connection admitting of the to and fro motion.

While the preferred embodiment of the invention has been described hereinabove and illustrated in the drawings as aforesaid, no limitation to the precise structure comprised in such disclosure is contemplated, excepting insofar as may necessarily be imposed by the language of the appended claims, since the invention is obviously susceptible of considerable modification and change within the scope of said claims, and since parts of the invention as disclosed may be employed without others, and in other and different environments.

I claim:

1. In a rubbing machine, a traveling support for the article to be rubbed, a reciprocating rubbing device movable longitudinally of the traveling support, means for reciprocating the rubber, and means for increasing the speed of movement of the rubbing device when traveling in the same direction as the support.

2. In a rubbing machine, a traveling support, a rubber mounted to move longitudinally of the support, means for moving the rubber, a plurality of means for connecting the rubber to the said moving means to cause it to move in opposite directions and controlled by the movement of the rubber, one of said means being arranged to drive the rubber at a higher speed than the other of said means.

3. In a rubbing machine, a traveling support for the work and a rubber mounted to reciprocate longitudinally of the support, means for moving the traveling support continuously in one direction, and means for reciprocating the rubber in each direction at the same speed relative to the movement of the work on the support.

4. In a rubbing machine, means for impelling the work to the machine and away therefrom, a conveyor for the work during the rubbing process, rubbing means, supporting and guiding means, actuating means therefor, adjustable reversing means for the actuating means, a dog thereon, a stop on said rubbing means, and means for reversing the direction and the speed of the actuating means upon contact of the stop and dog.

5. In a rubbing machine, a traveling support for the work, means for moving the support in one direction, a rubber mounted to reciprocate longitudinally of the support, a means for moving the rubber in each direction, means controlled by the moving rubber for connecting said means in alternation, one of said means moving the rubber at a higher speed than the other and being arranged to move the rubber in the same direction as the work is traveling, whereby to cause the rubber to move with respect to the work at the same relative speed, whether the rubber moves with the work or in the opposite direction.

6. In a rubbing machine, a traveling support for the work, and a rubber mounted to reciprocate longitudinally of the support, means for moving the traveling support continuously in one direction, means for reciprocating the rubber in the same direction as the movement of the work and at a higher speed when moving with the work than when moving in the opposite direction.

In testimony whereof I affix my signature.

ETHELBERT B. STUART.